United States Patent
Cmich et al.

(10) Patent No.: US 7,284,644 B2
(45) Date of Patent: Oct. 23, 2007

(54) MULTIPLE LOAD PATH AIR SPRING ASSEMBLY

(75) Inventors: Ryan Cmich, Wadsworth, OH (US); Dean R. Tener, Bath, OH (US)

(73) Assignee: BFS Diversified Products, LLC, Indianapolis, IN (US)

( * ) Notice: Subject to any disclaimer, the term of this patent is extended or adjusted under 35 U.S.C. 154(b) by 190 days.

(21) Appl. No.: 11/129,014

(22) Filed: May 13, 2005

(65) Prior Publication Data

US 2006/0208404 A1     Sep. 21, 2006

Related U.S. Application Data

(60) Provisional application No. 60/662,614, filed on Mar. 16, 2005.

(51) Int. Cl.
*F16F 9/00*     (2006.01)
(52) U.S. Cl. .................. 188/321.11; 267/220; 267/35; 267/293; 267/64.23; 267/64.27
(58) Field of Classification Search ........... 188/321.11; 267/217, 220, 35, 293, 64.11, 64.15, 64.19, 267/64.21, 64.23, 64.27, 122
See application file for complete search history.

(56) References Cited

U.S. PATENT DOCUMENTS

| | | | |
|---|---|---|---|
| 2,893,104 A | | 7/1959 | Hancock |
| 2,980,441 A | | 4/1961 | Timpner et al. |
| 3,046,000 A | * | 7/1962 | Polhemus et al. .......... 267/219 |
| 3,700,225 A | | 10/1972 | Fader et al. |
| 4,325,541 A | | 4/1982 | Korosladanyi et al. |
| 4,635,745 A | | 1/1987 | Myers et al. |
| 4,655,438 A | | 4/1987 | Cameron |
| 4,722,516 A | | 2/1988 | Gregg |
| 4,741,517 A | | 5/1988 | Warmuth, II et al. |
| 4,768,758 A | * | 9/1988 | Buma ...................... 267/64.21 |
| 4,988,082 A | | 1/1991 | Pees |
| 5,129,634 A | | 7/1992 | Harris |
| 5,180,144 A | * | 1/1993 | Hellyer et al. ........... 267/64.19 |
| 5,366,048 A | | 11/1994 | Watanabe et al. |

(Continued)

FOREIGN PATENT DOCUMENTS

DE          3610144     * 10/1987

(Continued)

*Primary Examiner*—Devon Kramer
(74) *Attorney, Agent, or Firm*—Fay, Sharpe, Beall, Fagan, Minnich & McKee, LLP; Michael R. Huber (57) ABSTRACT

An air spring assembly, for use on an associated vehicle suspension system having a mounting member and a damping member, includes spaced apart first and second end members. A flexible wall is secured on the first and second end members and defines a spring chamber therebetween. An isolator is supported on and sealingly engages the first end member. The isolator includes and isolator passage sealingly receiving the damping member. The isolator and the first end member at least partially form a first load transmission path such that a damping member load is distributed to the mounting member through the isolator and the first end member. The first end member at least partially forms a second load transmission path such that an air spring load is distributed to the mounting member through the first end member without substantial transmission through the isolator.

19 Claims, 5 Drawing Sheets

U.S. PATENT DOCUMENTS

| | | |
|---|---|---|
| 5,667,203 A | 9/1997 | Romer |
| 5,797,595 A | 8/1998 | Buma et al. |
| 6,089,552 A | 7/2000 | Pahl |
| 6,116,584 A | 9/2000 | Romer |
| 6,227,527 B1 * | 5/2001 | Berg .......................... 267/218 |
| 6,286,820 B1 * | 9/2001 | Raulf et al. .............. 267/64.21 |
| 6,361,027 B1 * | 3/2002 | Lun ........................ 267/64.21 |
| 7,077,052 B2 * | 7/2006 | Lloyd ........................ 92/98 D |
| 2004/0017030 A1 | 1/2004 | Dehlwes et al. |
| 2004/0026836 A1 | 2/2004 | Brookes |
| 2004/0222576 A1 | 11/2004 | Oldenettel |

FOREIGN PATENT DOCUMENTS

| | | |
|---|---|---|
| FR | 2 283 022 A | 3/1976 |
| FR | 2 556 659 A | 6/1985 |

* cited by examiner

MULTIPLE LOAD PATH AIR SPRING ASSEMBLY

This application claims priority from U.S. Provisional Patent Application No. 60/662,614 filed on Mar. 16, 2005, which is hereby incorporated herein by reference in its entirety.

BACKGROUND

The present novel concept broadly relates to the art of vehicle suspension systems and, more particularly, to an air spring assembly having multiple load transmission paths.

In known suspension systems, particularly those utilizing spring over damper assemblies, the suspension components are often supported using a mounting arrangement that provides only a single load transmission path. It is well understood that various inputs, loads or forces are commonly associated with vehicle suspensions, including spring and jounce bumper loads which are generally unidirectional and damper loads which are normally bidirectional. Single load path mounting arrangements typically include a bearing element mounted on or within an elastomeric isolator that is secured on a mounting plate. In turn, the mounting plate is attached to the vehicle chassis or body and the loads are transmitted along the single load path through the mounting plate to the vehicle chassis or body. As a result, such single load path mounting arrangements have numerous problems and disadvantages that it is desirable to avoid.

One such disadvantage is that the elastomeric isolator must be designed to isolate the three primary suspension inputs (spring, damper and jounce bumper inputs), which commonly have significantly different magnitudes, frequencies and can also operate in different directions, as indicated above. For example, it is well understood that the spring and bumper inputs can be substantially greater than the damper inputs, and can, in some cases, exceed the damper inputs by one or more orders of magnitude. Thus, the elastomeric isolator is normally designed to at least partially reduce the transmission of all three inputs. This generally results in a compromise design that is different than the design would be for any one individual input. Unfortunately, the resulting isolator is typically biased away from a high compliance and toward a high stiffness to accommodate the higher loads of the spring and bumper inputs, and to support the entire weight of the vehicle as well. This results in increased harshness of the ride quality of the vehicle and can contribute to a corresponding decrease in passenger comfort.

Another disadvantage of such single load path mounting arrangements is that the forces of higher magnitude that are applied to the isolator tend to accelerate the degradation of the elastomeric material. As such, it is possible for undesirable characteristics, such as reduced performance of the suspension system, increased component wear and/or increased maintenance and repair costs to result from utilizing such mounting arrangements. Therefore, elastomeric isolators are often made more robust to counteract this potential change in performance, which tends to further stiffen the isolator and undesirably add to ride harshness.

In an effort to overcome these and other disadvantages, mounting arrangements have been developed that provide multiple load transmission paths for vehicle suspension inputs. However, such known arrangements are primarily used in association with steel coil springs. Those of skill in the art will recognize that in these multiple path mounting arrangements, the spring and damping member typically move independently of one another. In suspension systems that utilize coil springs, this does not normally present an issue. However, establishing and reliably maintaining a fluid-tight seal between suspension components that are capable of independent movement is considerably more challenging and can result in the generation of leak paths, component wear and other undesirable performance problems and/or losses. As such, suspension systems using air springs have heretofore been relegated to the use of single load path mounting arrangements in which the air spring and damper move in relative unison with one another and such losses and other disadvantages are more easily overcome.

BRIEF DESCRIPTION

An exemplary embodiment of an air spring assembly in accordance with the present novel concept, for use on an associated vehicle suspension system that includes a mounting member and a damping member, is provided and includes spaced apart first and second end members. A flexible wall is secured on the first and second end members and defines a spring chamber therebetween. An isolator is supported on and sealingly engages the first end member. The isolator includes an isolator passage sealingly receiving the damping member. The isolator and the first end member at least partially form a first load transmission path such that a damping member load is distributed to the mounting member through the isolator and the first end member. The first end member at least partially forms a second load transmission path such that an air spring load is distributed to the mounting member without substantial transmission through the isolator.

An exemplary embodiment of an air spring and damper assembly in accordance with the present novel concept, for use on an associated vehicle having first and second suspension mounting members in spaced relation to one another, is provided and includes a damping member having first and second opposing ends. The first end of the damping member is supported on the first suspension mounting member. An air spring is secured along the damping member and includes a first end member, a second end member in spaced relation to the first end member, and a flexible wall secured on the first and second end members and at least partially forming a spring chamber therebetween. The first end member is supported on the damping member toward the first end thereof. An isolator is supported on and sealingly engages the second end member. The second end member is secured on the second suspension mounting member and at least partially forms a first load transmission path therewith such that a load on said air spring is transmitted to the second suspension mounting member through the second end member without substantial transmission through the isolator. The isolator receives and sealingly engages the second end of the damping member. The isolator at least partially forms a second load transmission path to the second suspension mounting member through the second end member such that a damping member load is transmitted to the second suspension mounting member through the isolator and the second end member.

An exemplary embodiment of an spring and damper assembly in accordance with the present novel concept, for use on an associated vehicle having first and second suspension mounting members in spaced relation to one another, is provided and includes a damping member and a spring assembly. The damping member includes first and second opposing ends. The first end of the damping member is supported on the first suspension mounting member. The spring assembly is secured along the damping member and includes a first support member and a second support member in spaced relation to the first support member. A flexible spring element is supported therebetween. The first support member is secured on the damping member toward the first end thereof. A bumper is disposed along the damping member, and an isolator is supported on and sealing engages the second support member and the damping member. The second support member is secured on the second suspension mounting member and at least partially forms a first load transmission path therewith such that a load on said spring element and a load on said bumper are each transmitted to the second suspension mounting member through the second end member without substantial transmission through the isolator. The isolator at least partially forming a second load transmission path to the second suspension mounting member through the second end member such that a load on the damping member is transmitted to the second suspension mounting member through the isolator and the second end member.

An exemplary embodiment of an air spring assembly in accordance with the present novel concept, for use on an associated vehicle suspension system having an associated damping member and an associated vehicle mounting structure, is provided and includes spaced apart first and second end members and a flexible wall secured on the first and second end members. An isolator is supported on and sealingly engages the first end member, and is adapted for operative use with the associated damping member. A compliant-member load transmission path extends along at least a portion of the isolator and the first end member such that a damping member load is distributed therealong toward the associated vehicle mounting structure. A rigid-member load transmission path extends along at least a portion of the first end member such that an air spring load is distributed therealong toward the associated vehicle mounting structure without substantial transmission through the isolator.

DETAILED DESCRIPTION

Figure 1:
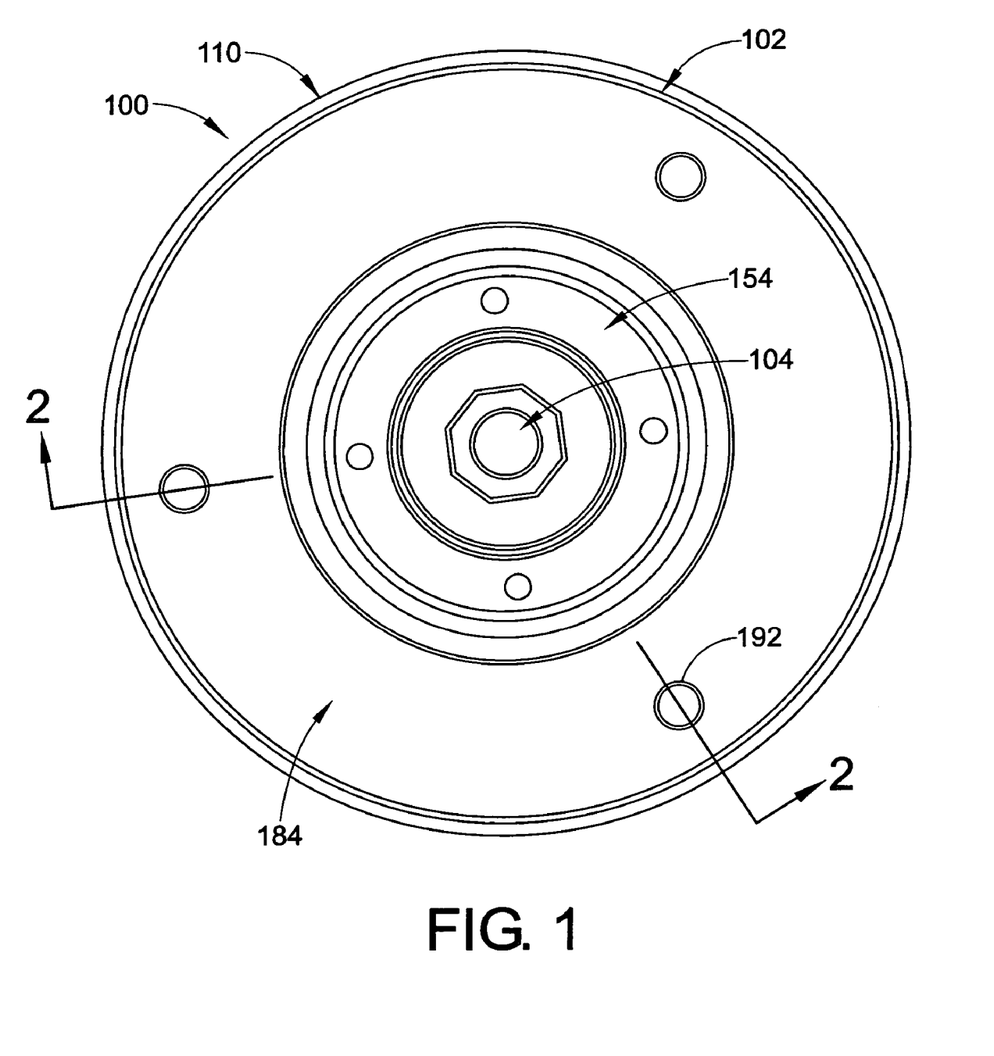
FIG. 1 is a top plan view of one embodiment of an air spring and damper assembly in accordance with the present novel concept.
Figure 2:
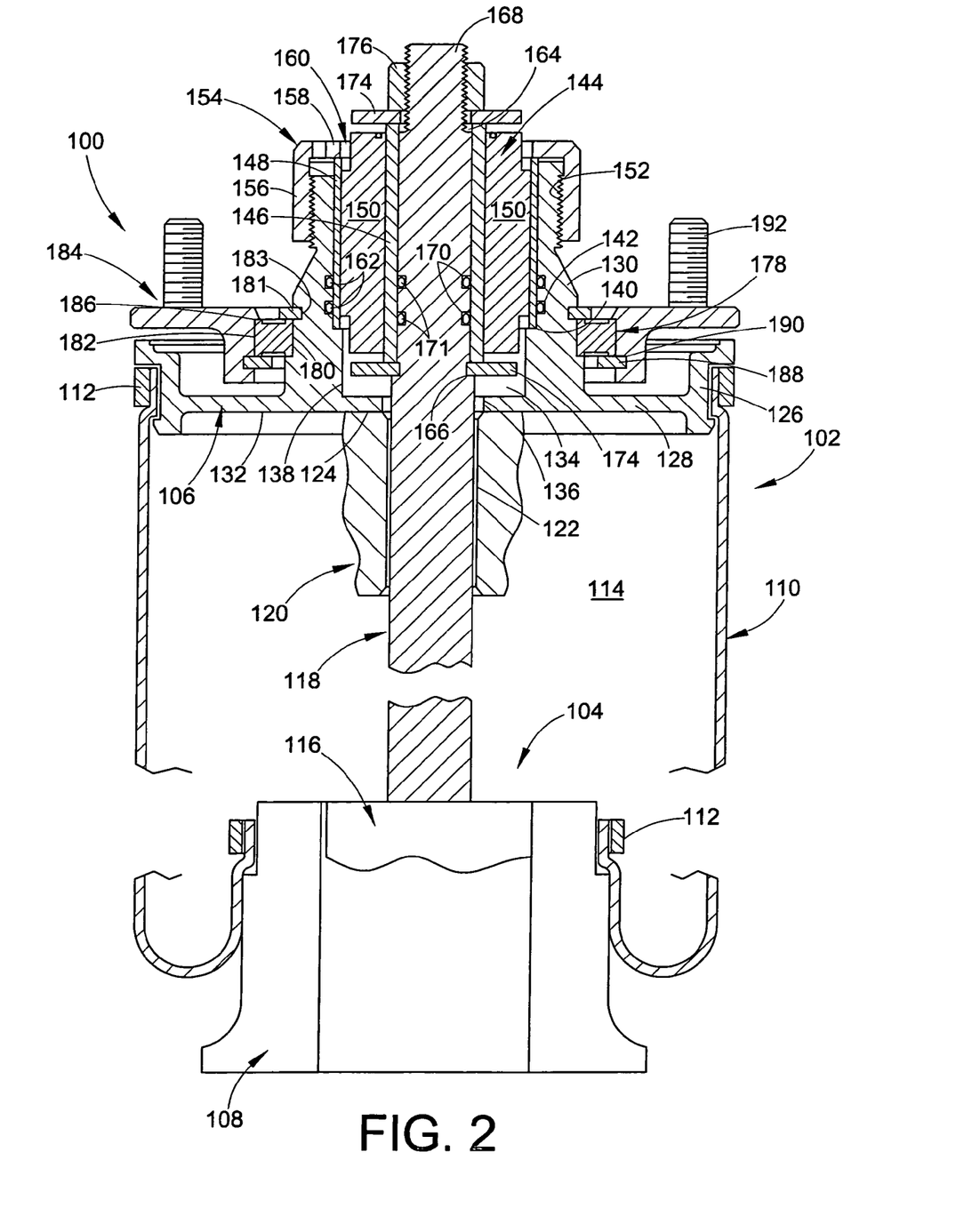
FIG. 2 is a cross-sectional side view of the air spring and damper assembly in FIG. 1 taken along 2-2.

Turning now to the drawings wherein the showings are for the purposes of illustrating exemplary embodiments of the present novel concept only and not for the purposes of limiting the same, FIGS. 1 and 2 illustrate an air spring and damper assembly 100 including an air spring 102 and a damping member 104. Air spring 102 includes a first end member, such as a top cap 106, for example, a second end member, such as a piston 108, for example, spaced from the first end member and a flexible spring member, such as a flexible sleeve 110, for example, supported between the end members. In one exemplary embodiment, flexible sleeve 110 can be secured along the spaced end members using retaining members, such as crimp rings 112, for example. A spring chamber 114 is formed within sleeve 110 between the end members. Air spring 102 is shown and described herein as being a rolling lobe-type air spring. However, it will be appreciated that any other suitable type of air spring could alternately be used, such as a convoluted-type air spring, for example.

Damping member 104 includes an elongated tubular housing 116 and a damping rod 118 that extends therefrom. It will be appreciated that any suitable type, kind and/or configuration of damper can be used, and that in the exemplary embodiment shown in FIG. 2, damping member 104 is a MacPherson strut of substantially conventional construction. Piston 108 of air spring 102 is supported on housing 116 and can be secured thereto in any suitable manner, such as by using fasteners (not shown) or a welded joint (not shown), for example. A jounce bumper 120 is disposed along damping rod 118 within spring chamber 114 and is of a standard construction. The jounce bumper includes an inner wall 122 forming a passage (not numbered) therethrough and an end wall 124 disposed adjacent top cap 106.

Top cap 106 includes an outer radial wall 126 along which flexible side wall 110 is secured. A web portion 128 connects outer radial wall 126 with a central wall 130. Web portion 128 includes a bottom surface 132 disposed toward spring chamber 114, and end wall 124 of bumper 120 is disposed adjacent bottom surface 132. Central wall 130 projects outwardly from web portion 128 in a direction generally opposite bottom surface 132. A passage 134 is formed through top cap 106 by passage walls 136 and 138. Passage wall 138 is radially outwardly stepped to form an annular shoulder 140 within passage 134. Additionally, a plurality of radially outwardly extending grooves 142 can optionally be provided along passage 138.

An isolator 144 is received within passage 134 and includes an inner sleeve 146 (also known in the art as inner metal), an outer sleeve 148 (also known in the art as outer metal) and elastomeric material 150 disposed therebetween. It will be appreciated that isolating devices, such as isolator 144, for example, are well known and commonly used in a wide variety of applications and environments. The design and construction of such isolating devices is well known by those of skill in the art. As such, it is to be understood that any suitable type, kind and/or construction of isolator can be used without departing from the principles of the present novel concept.

Central wall 130 includes a plurality of threads (not numbered) extending along an outer threaded portion 152 thereof, and an insert cap 154 includes an inner threaded wall 156 and an end wall 158 having a passage 160 formed therethrough. Insert cap 154 threadably engages central wall 130 to capture outer sleeve 148 between shoulder 140 and end wall 158. A fluid-tight seal is formed between outer sleeve 148 and passage wall 138, such as by disposing a sealing member therebetween. Alternately, outer sleeve 148 can be omitted and elastomeric material 150 can be directly molded on or otherwise sealingly attached to passage wall 138. As shown in FIG. 2, o-rings 162 are received in grooves 142 and form a substantially fluid-tight seal between outer sleeve 148 and passage wall 138. It will be appreciated, however, that any other suitable manner of sealingly engaging isolator 144 and central wall 130 can be used, such as by using a quad-ring, a lip seal, an adhesive compound and/or a sealant, for example, alone or in combination with one another.

Damping rod 118 extends into and through passage 134 of top cap 106 and engages isolator 144. Inner sleeve 146 defines an isolator passage 164, and damping rod 118 extends therethrough and sealingly engages inner sleeve 146 in a suitable manner, as discussed above. Damping rod 118 includes a radially inwardly stepped annular shoulder 166 and a threaded end 168 generally opposite housing 116. Additionally, radially inwardly extending grooves 170 can optionally be provided along damping rod 118 and can be used to receive suitable sealing members, such as o-rings 171, for example. The damping rod extends through passage 164 such that threaded end 168 projects outwardly therefrom. A jounce washer 172 is received on damping rod 118 and engages shoulder 166. A rebound washer 174 is disposed along threaded end 168 and secured thereon by a threaded nut 176. Inner sleeve 146 is captured between washers 172 and 174 thereby securing isolator 144 on damping rod 118.

A bearing 178 is secured along an exterior wall portion 180 of central wall 130 and can be secured therealong in a suitable manner. For example, in FIG. 2, an inner race (not shown) of bearing 178 is captured between a shoulder (not numbered) on central wall 130 and a retaining ring 181 received in a radially inwardly extending groove 183. Additionally, bearing 178 is supported along an inner wall 182 of a mounting member 184. The bearing can be secured on the mounting member in any suitable manner. For example, in FIG. 2, an outer race (not numbered) is captured between a shoulder 186 and a retaining ring 188 received in a radially outwardly extending groove 190. Mounting member 184 can be secured on a vehicle chassis or body in any suitable manner for retaining the various suspension components in the proper position and transmitting the inputs therefrom to the chassis or body of the vehicle, such as by using mounting studs 192, for example.

It is to be distinctly understood that the foregoing embodiment is merely exemplary of one suitable embodiment of the present novel concept, and that a variety of modifications and alterations can be made without departing from the scope and intent of the present novel concept. For example, isolator 144 could alternately be captured on or within end member 106 by crimping, swaging or otherwise deforming a portion of central wall 130 instead of using a threaded connection with insert cap 154. In which case, either one or both of the jounce and rebound washers could optionally be formed as part of the inner sleeve or otherwise affixed on isolator 144. As another example, bearing 178 could be captured and/or retained on one or both of end member 106 and mounting member 184 by crimping swaging or otherwise deforming a portion of the end or mounting member instead of using retaining members, such as retaining rings 181 and 188. Such modifications, and others, could result in a more permanently assembled air spring assembly and may be better suited for mass production practices. It is to be understood that other such production oriented modifications are likewise intended to fall within the scope of the present novel concept.

Figure 3:
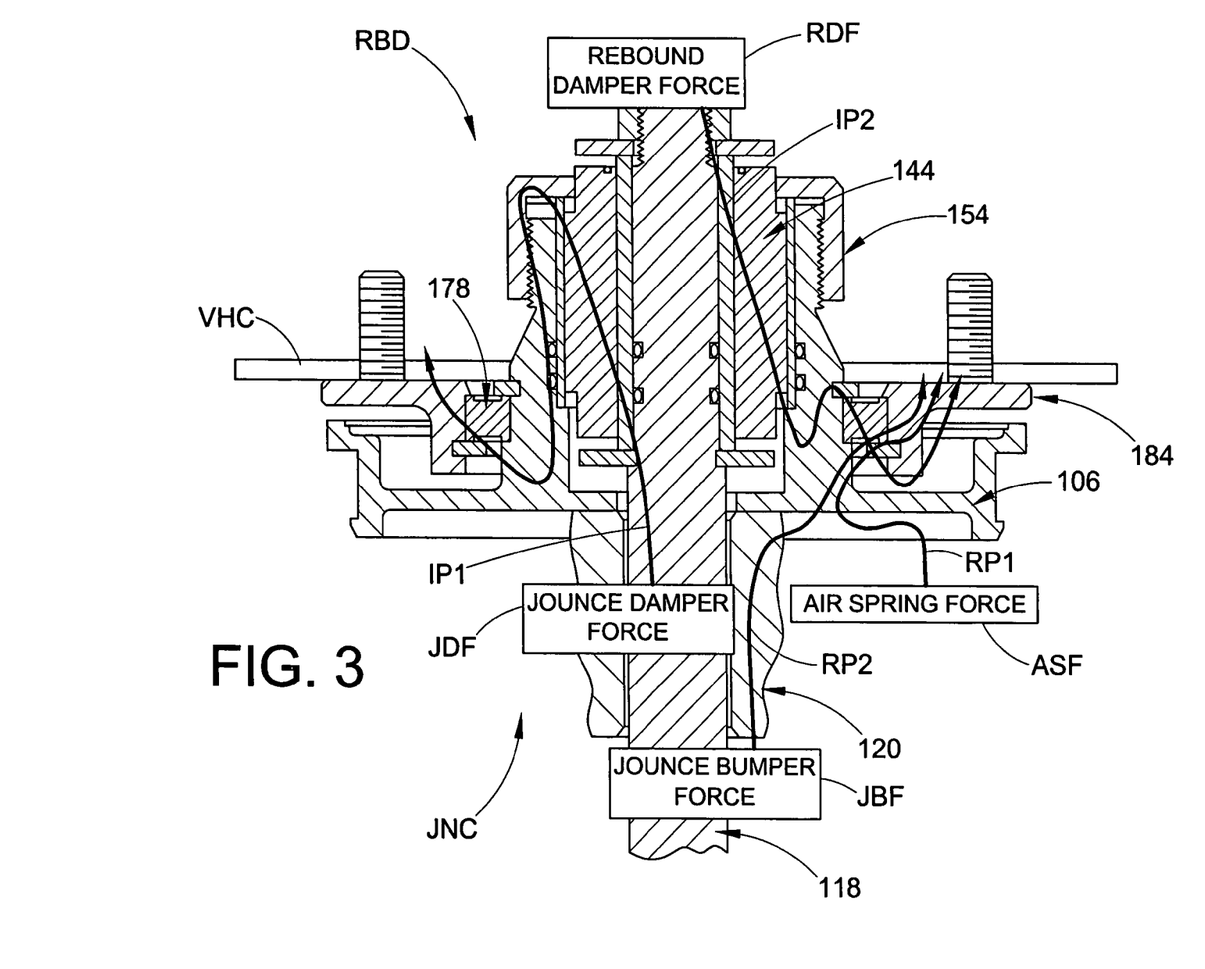
FIG. 3 is a load transmission path diagram superimposed on the cross-sectional side view of FIG. 2.

FIG. 3 illustrates air spring and damper assembly 100 secured on a vehicle chassis VHC through bearing 178 and mounting member 184. Additionally, numerous exemplary load paths are superimposed over the air spring and damper assembly, bearing and mounting member to generally indicate exemplary paths through which load inputs, such as air spring, jounce bumper and damper forces, for example, can be directed. An air spring force ASF is applied to end member 106 by the air pressure within the spring chamber of the air spring, as well is understood by those of skill in the art. Force ASF on end member 106 is transmitted to vehicle chassis VHC along a rigid-member load path formed by substantially rigid components. In the embodiment in FIGS. 1-3, a rigid-member load path RP1 includes bearing 178 and mounting member 184 and force ASF is transmitted therealong. Thus, it will be appreciated that end member 106, bearing 178 and mounting member 184 are all substantially rigid members and that force ASF is not directed to any substantial degree or amount through isolator 144. It will be understood, however, that in practice, some portion of the air spring load could be directed through the isolator, such as due to the air pressure within the air spring acting on the exposed surface area of the flexible material or jounce washer, for example. By utilizing the present novel concept, however, such undesirable load inputs are minimized and the majority of the air spring load input is directed through a rigid-member load path, such as load path RP1 discussed above, for example. As a more specific example of a load input distribution, from about 93 percent to about 99 percent of the sprung mass of the vehicle corner can be directed along a rigid-member load path and, preferably, from about 98 percent to about 99 percent of the sprung mass of the vehicle corner is directed along a rigid-member load path.

As is generally known by those of skill in the art, jounce forces operate in a direction in which a wheel of a vehicle moves toward or into the chassis of the vehicle, and such a jounce direction is indicated by arrow JNC in FIG. 3. Oppositely, rebound forces act in a direction of a wheel moving down or outwardly from the chassis of a vehicle, and such a rebound direction is indicated by arrow RBD in FIG. 3. Upon the extreme movement of a wheel in the jounce direction, which is indicated by arrow JNC, the piston or other, lower end member of an air spring will impact a jounce bumper, such as bumper 120, for example, and generate a jounce bumper force JBF that also acts in direction indicated by arrow JNC. As mentioned above, the jounce bumper is in abutting engagement with the upper end member of the air spring, such as top cap 106, for example, and jounce bumper force JBF is transmitted from the jounce bumper into the end member and through to vehicle chassis VHC along a rigid-member load path. Another exemplary rigid-member load path is shown in FIG. 3 as load path RP2, which includes bearing 178 and mounting member 184. Rigid-member load path RP2 is substantially similar to load path RP1, but path RP2 begins from the jounce force on the bumper rather than the air spring input load.

The action of damper 104 as is well understood by those of skill in the art, and includes a jounce damper force JDF acting in the direction indicated by arrow JNC and a rebound damper force RDF acting in the direction indicated by arrow RBD. Jounce damper force JDF and rebound damper force RDF are respectively transmitted along a compliant-member load path rather than a rigid-member load path discussed above. One exemplary compliant-member load path is shown in FIG. 3 in association with jounce damper force JDF as load path IP1. Jounce damper force JDF is directed along compliant-member load path IP1, which includes jounce washer 172, isolator 144 and end member 106. Path IP1 is shown in FIG. 3 as including insert cap 154. However, it will be appreciated that in other constructions, isolator 144 may be retained by end member 106 without insert cap 154, which would therefore be eliminated from load path IP1. Thereafter, jounce damper force JDF is directed along path IP1 which extends through bearing 178 to mounting member 184. Rebound damper force RDF is transmitted from damping member 118 along a compliant-member load path IP2, which includes rebound washer 174, isolator 144 and end member 106. Thereafter, rebound damper force RDF is directed along path IP2 which extends through bearing 178 to mounting member 184.

Figure 4:
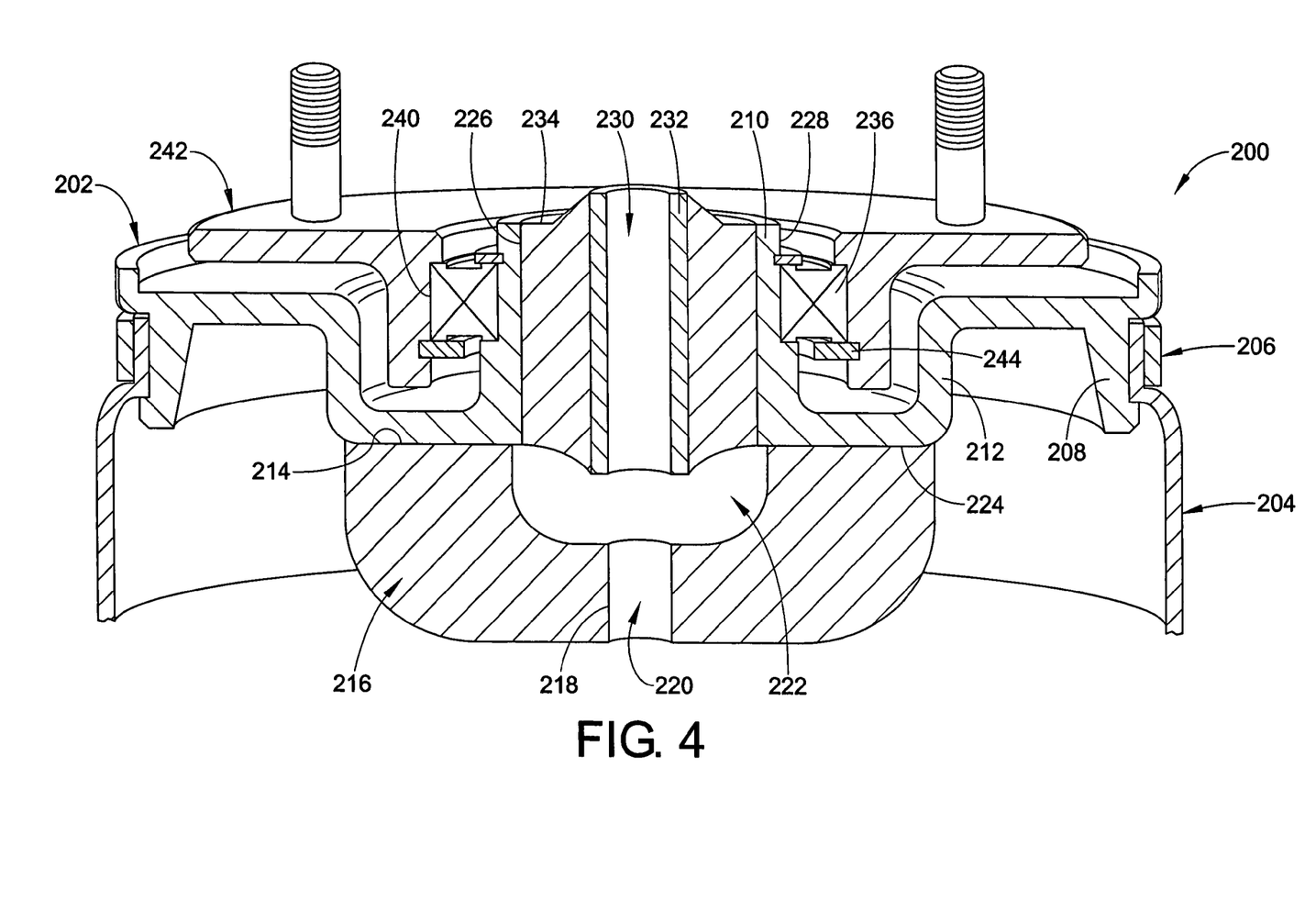
FIG. 4 is a cross-sectional side view of an alternate embodiment of an air spring assembly in accordance with the present novel concept.

Another exemplary embodiment of an air spring 200 in accordance with the present novel concept is shown in FIG. 4 and includes a first end member, such as a top cap 202, for example, a second end member, such as a piston (not shown), for example, and a flexible spring member, such as a flexible wall or sleeve 204, for example, secured therebetween, such as by using a crimp ring 206, for example, along each end thereof. A suitable damping member (not shown), such as damper 104, for example, will be used in operative association with air spring 200 in a manner substantially similar to that discussed hereinbefore with regard to air spring 102 in FIGS. 1-3. Top cap 202 includes an outer radial wall 208 secured to a central wall 210 by an annular web portion 212. The annular web portion includes a bottom surface 214 and a jounce bumper 216 disposed adjacent bottom surface 214. The jounce bumper includes an inside wall 218 forming a passage 220 therethrough. Additionally, jounce bumper 216 includes a recess 222 that extends inwardly from an end wall 224, which is disposed in abutting engagement with bottom surface 214 when undergoing a jounce bumper load.

Central wall 210 includes an inside surface 226 and an outer surface 228. Inside surface 226 forms a passage (not numbered) extending through top cap 202 and an isolator 230 is disposed within the passage along inside surface 226. Isolator 230 includes an inner sleeve 232 and elastomeric material 234 extending between inner sleeve 232 and inside surface 226 of central wall 210. Isolator 230 differs from isolator 144 discussed hereinbefore in that an outer sleeve, such as outer sleeve 148 of isolator 144, for example, is not used. Rather, elastomeric material 234 is directly molded onto or otherwise adhered along inside surface 226. A bearing 236 can be secured along outside surface 228 in any suitable manner, such as by using a retaining ring 238, for example, as has been discussed above. Bearing 236 is supported along an inside wall 240 of a mounting member 242 and can be secured therealong in any suitable manner, such as by using a retaining ring 244, for example, as has been discussed above.

Figure 5:
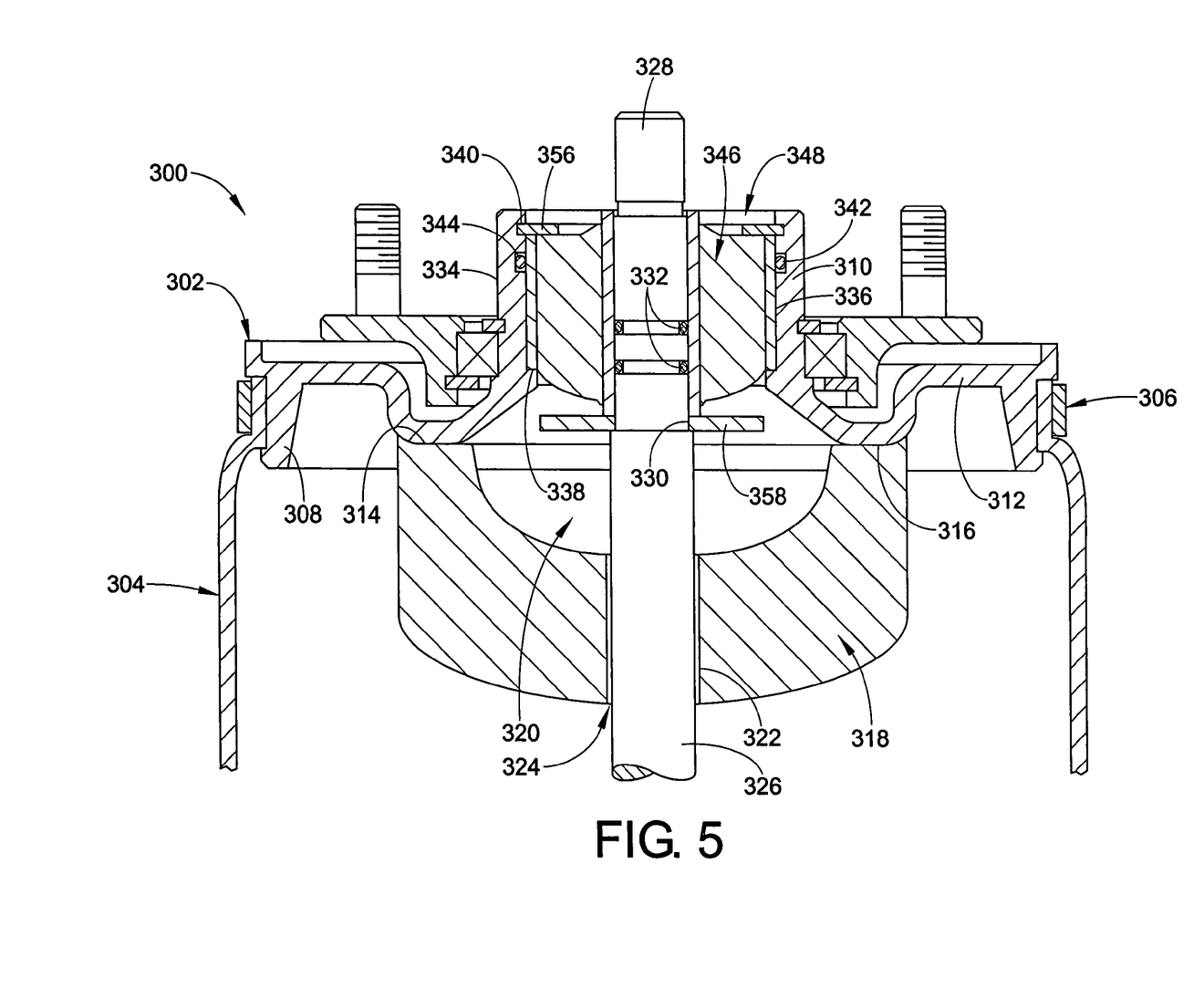
FIG. 5 is a cross-sectional side view of another alternate embodiment of an air spring assembly in accordance with the present novel concept.

Still another exemplary embodiment of an air spring 300 in accordance with the present novel concept is shown in FIG. 5 and includes a first end member, such as a top cap 302, for example, a second end member, such as a piston (not shown), for example, spaced from the first end member and a flexible spring member, such as a sleeve 304, for example, secured therebetween in a suitable manner, such as by using a crimp ring 306, for example, along each end thereof. Top cap 302 is similar to top caps 106 and 202 discussed hereinbefore, and includes an outer radial wall 308, a central wall 310 and an annular web portion 312 extending therebetween. The annular web portion includes a bottom surface 314 suitable for engaging an end wall 316 of a jounce bumper 318. The jounce bumper also includes a recess 320 formed inwardly from end wall 316 and an inside wall 322 forming a passage 324 therethrough.

A suitable damping member (not shown) includes a damping rod 326 as is well known by those of skill in the art. Damping rod 326 includes a threaded end 328 and an annular shoulder 330. A plurality of radially inwardly extending grooves 332 can optionally be provided and may be suitable for receiving a sealing member, such as an o-ring (not shown), for example.

Central wall 310 includes an outer surface 334 and an inner surface 336. A shoulder 338 is formed along inner surface 336 and a radially outwardly extending groove 340 is spaced therefrom. One or more additional grooves 342 can optionally be provided and can optionally receive a sealing member, such as an o-ring 344, for example.

An isolator 346 is disposed within a passage 348 formed through end member 302 by inner surface 336. Isolator 346 includes an inner sleeve 350, an outer sleeve 352 and elastomeric material 354 extending therebetween. Outer sleeve 352 is captured between shoulder 338 and a retaining ring 356 received within groove 340. Damping rod 326 extends through a passage (not shown) formed through isolator 346 by inner sleeve 350. The inner sleeve is captured on damping rod 326 between a jounce washer 348 and a rebound washer (not shown) and threaded nut (not shown) spaced opposite the jounce washer, as discussed above. A bearing 360 is supported along outer surface 334 of central wall 310 and engages a mounting member 362 and is secured therebetween in a suitable manner, such as those discussed in detail above.

It will be appreciated that air springs 200 and 300 discussed above function to transmit loads to a vehicle chassis or body along rigid-member and isolating load paths, such as those discussed above with regard to assembly 100 in FIGS. 1-3, for example. Additionally, it will be understood that load paths other than or in addition to paths RP1, RP2, IP1 and IP2 can be used without departing from the principles of the present novel concept.

While the invention has been described with reference to the foregoing embodiments and considerable emphasis has been placed herein on the structures and structural interrelationships between the component parts of the embodiments disclosed, it will be appreciated that other embodiments of the present novel concept can be made and that many changes can be made in the embodiments illustrated and described without departing from the principles of the present novel concept. Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the present novel concept be construed as including all such modifications and alterations insofar as the same come within the scope of the appended claims and the equivalents thereof.

The invention claimed is:

1. An air spring assembly for use on an associated vehicle suspension system that includes an associated rigid mounting structure and an associated damping member, said air spring assembly comprising:

spaced apart first and second end members;

a flexible wall secured on said first and second end members and defining a spring chamber therebetween;

a mounting member disposed adjacent said first end member and rigidly affixed on the associated rigid mounting structure;

a bearing element for providing reduced-friction rotational motion operatively secured between said first end member and said mounting member such that said first end member is substantially-freely rotatable with respect to said mounting member;

an isolator supported on and sealingly engaging said first end member, said isolator including an isolator passage suitable for sealingly receiving the associated damping member; and, a jounce bumper supported within said spring chamber for receiving a bumper load, said jounce bumper operative to engage said first end member and thereby transfer substantially all of said bumper load to said first end member with substantially none of said bumper load transferred to said isolator;

said isolator at least partially forming a first load transmission path together with said first end member, said bearing element and said mounting member such that a load attributed to the associated damping member is distributed to the associated rigid mounting structure through said isolator along said first load transmission path;

said first end member, said bearing element and said mounting member at least partially forming a second load transmission path such that an air spring load and said bumper load are distributed to the associated rigid mounting structure along said second load transmission path without any substantial portion of said air spring load or said bumper load being transferred to said isolator.

2. An air spring assembly according to claim 1, wherein said first end member includes a bumper-engaging surface adapted to engage said jounce bumper.

3. An air spring assembly according to claim 1 further comprising a sealing member forming a substantially fluid-tight seal with said isolator and one of said first end member and said damping member.

4. An air spring assembly according to claim 3, wherein said sealing member is a first sealing member that forms a substantially fluid-tight seal between said isolator and said damping member, and said air spring assembly further comprises a second sealing member forming a substantially fluid-tight seal between said isolator and said first end member.

5. An air spring assembly according to claim 3, wherein said damping member includes a damping housing and a damping rod projecting from said damping housing, said isolator includes an inner sleeve and an elastomeric wall disposed outwardly along said inner sleeve and sealingly attached on said first end member, and said inner sleeve includes said isolator passage and receives said damping rod of said damping member.

6. An air spring assembly according to claim 1, wherein said second load transmission path carries from about 93 percent to about 99 percent of a sprung vehicle corner weight.

7. An air spring and damper assembly for use on an associated vehicle having associated first and second suspension mounting structures in spaced relation to one another, said air spring and damper assembly comprising:

a damping member having first and second opposing ends, said first end of said damping member supported on the associated first suspension mounting structure;

an air spring secured along said damping member and including a first end member, a second end member in spaced relation to said first end member and a flexible wall secured on said first and second end members and at least partially forming a spring chamber therebetween, said first end member being supported on said damping member toward said first end thereof;

an isolator supported on and sealingly engaging said second end member;

a mounting member disposed adjacent said second end member and rigidly attached to the associated second suspension mounting structure;

a bearing element for permitting reduced-friction rotational motion between first and second bearing portions thereof said first bearing portion being operatively secured along said second end member and said second bearing portion being operatively secured on said mounting member such that said second end member and said mounting member are operatively connected to one another with said second end member is substantially-freely rotatable with respect to said mounting member; and, a bumper disposed along said damping member within said spring chamber, said bumper adapted to engage said second end member under an applied bumper load such that substantially all of said bumper load is transferred to said second end member with substantially none of said bumper load being transferred to said isolator;

said second end member, said bearing element and said mounting member at least partially forming a rigid load-transmission path such that a load on said air spring and said bumper load are both substantially entirely transmitted to the associated second suspension mounting along said rigid load-transmission path without any substantial any substantial portion of said load on said air spring and said bumper load being transferred through said isolator;

said isolator receiving and sealingly engaging said second end of said damping member, said isolator at least partially forming compliant load-transmission path to the associated second suspension mounting such that a damping member load is transmitted to the associated second suspension mounting structure along said compliant load-transmission path.

8. An air spring and damper assembly according to claim 7, wherein said second end member includes an approximately planar wall portion and said bumper includes a bumper end wall abuttingly engaging said approximately planar wall portion of said second end member to transfer said bumper load thereto.

9. An air spring and damper assembly according to claim 7, wherein said first end member is a piston, said second end member is a top cap and said flexible wall is an elastomeric sleeve forming a rolling lobe along said piston.

10. An air spring and damper assembly according to claim 9, wherein said damping member includes a damping housing and a damping rod and said first end of said damping member is a distal end of said damping housing and an opposing proximal end of said damping housing is secured on said piston, said damping rod extends from said proximal end of said damping housing and includes an opposing attachment end secured on said isolator.

11. An air spring and damper assembly according to claim 9, wherein said top cap includes a passage wall at least partially defining a passage extending therethrough and said isolator is at least partially received within said passage.

12. An air spring and damper assembly according to claim 7 further comprising a sealing member forming a substantially fluid-tight seal with said isolator and one of said damping member and said second end member.

13. An air spring and damper assembly according to claim 12, wherein said sealing member includes at least one of an O-ring, a quad-ring, a lip seal, a sealant compound and an adhesive compound.

14. An air spring and damper assembly according to claim 7, wherein said isolator is optimized for isolation of a load from said damping member.

15. A spring and damper assembly for use on an associated vehicle having associated first and second suspension mounting structures in spaced relation to one another, said spring and damper assembly comprising:

a damping member including first and second opposing ends and a longitudinally-extending axis therebetween, said first end of said damping member supported on the associated first suspension mounting structure;

a spring assembly secured along said damping member and including a first support member, a second support member in spaced relation to said first support member and a flexible spring element supported therebetween, said first support member being secured on said damping member toward said first end thereof;

a bumper disposed along said damping member and adapted to receive a load applied thereto;

a mounting member disposed between said second support member and the associated second suspension mounting structure, said mounting member being rigidly affixed to the associated second suspension mounting structure such that relative displacement therebetween is prevented;

a bearing element for providing reduced-friction rotational motion and axial rigidity is operatively connected between said mounting member and said second support member such that said mounting member and said second support member can rotate relative to one another about said axis without permitting substantial axial displacement therebetween; and, an isolator supported on and sealingly engaging said second support member and said damping member, said isolator including a compliant portion suitable for substantial relative displacement in at least one of an axial direction and a radial direction;

said second support member secured on said second suspension mounting structure through said bearing element and said mounting member and at least partially forming a rigid-member load transmission path therewith such that a load on said spring element and a load on said bumper are each substantially entirely transmitted to said second suspension mounting member through said second end member without any substantial portion of either of said load on said spring element or said load on said bumper transmission through said isolator;

said isolator at least partially forming a compliant-member load transmission path to the associated second suspension mounting structure through said second end member such that a load on said damping member is transmitted to said second suspension mounting member through said isolator and along said compliant-member load transmission path.

16. A spring and damper assembly according to claim 15, wherein said spring assembly includes one of a coil spring and an air spring.

17. An air spring assembly for use on an associated vehicle suspension system having an associated damping member and an associated vehicle mounting structure, said air spring assembly comprising:

spaced apart first and second end members having a longitudinally-extending axis formed therebetween;

a flexible wall secured on said first and second end members;

an isolator supported on and sealingly engaging said first end member and adapted for operative use with the associated damping member, said isolator including a compliant portion capable of substantial relative displacement in at least one of an axial direction and a radial direction;

a mounting member fixedly secured to the associated vehicle mounting structure and positioned adjacent said first end member;

a bearing element operatively secured between said first end member and said mounting member for permitting reduced-friction rotational motion therebetween while maintaining substantial axial rigidity; and, a jounce bumper disposed between said first and second end members and adapted to receive an applied bumper load;

a first load transmission path extending along at least a portion of said isolator, and said first end member, said bearing element and said mounting member such that a damping member load is distributed therealong through said compliant portion of said isolator toward the associated vehicle mounting structure; and, a second load transmission path extending along at least a portion of said first end member, said bearing element and said mounting member such that an air spring load and said bumper load are distributed therealong toward the associated vehicle mounting structure without substantial displacement therethrough and without substantial transmission through said isolator.

18. An air spring assembly according to claim 17, wherein said first and second load paths converge along said first end member.

19. An air spring assembly according to claim 17, wherein said second load transmission path carries from about 93 percent to about 99 percent of a sprung vehicle weight.

* * * * *